US006645381B2

United States Patent
McEvoy

(10) Patent No.: US 6,645,381 B2
(45) Date of Patent: Nov. 11, 2003

(54) MODULAR ASSEMBLY FOR HOLLOW MEMBRANE FIBER CARTRIDGES

(75) Inventor: Thomas J. McEvoy, Minnetonka, MN (US)

(73) Assignee: Applied Membrane Technology, Inc., Minnetonka, MN (US)

( * ) Notice: Subject to any disclaimer, the term of this patent is extended or adjusted under 35 U.S.C. 154(b) by 30 days.

(21) Appl. No.: 09/865,779

(22) Filed: May 25, 2001

(65) Prior Publication Data

US 2002/0003105 A1 Jan. 10, 2002

Related U.S. Application Data

(60) Provisional application No. 60/207,600, filed on May 26, 2000.

(51) Int. Cl.[7] .......................... B01D 63/00; B01D 24/00; C02F 1/44
(52) U.S. Cl. ............................ 210/321.78; 210/321.79; 210/321.8; 210/321.88; 210/321.89; 210/323.1; 210/323.2
(58) Field of Search .................... 210/323.2, 321.6, 210/321.64, 321.72, 321.79, 321.78, 321.8, 321.88, 321.89, 500.23, 323.1; 96/10

(56) References Cited

U.S. PATENT DOCUMENTS

| 3,698,559 A | * | 10/1972 | Manjikian ................. 210/321.9 |
| 4,806,246 A | | 2/1989 | Nomura |
| 4,824,444 A | | 4/1989 | Nomura |
| 4,849,104 A | * | 7/1989 | Garcera et al. ........... 210/323.2 |
| 5,470,469 A | | 11/1995 | Eckman |
| 5,484,528 A | * | 1/1996 | Yagi et al. ................... 210/232 |
| 6,165,361 A | * | 12/2000 | Heine .......................... 210/232 |
| 2002/0000404 A1 | * | 1/2002 | Mutsakis et al. ......... 210/323.2 |

* cited by examiner

Primary Examiner—W. L. Walker
Assistant Examiner—Krishnan S Menon
(74) Attorney, Agent, or Firm—Haugen Law Firm PLLP

(57) ABSTRACT

A modular fluid treatment system utilizing hollow fiber cartridges held within the controlled environment of a reaction chamber, with the system being designed to accommodate and facilitate ease of access to individual cartridges within a given module. The arrangement provides for parallel operation of a group of individual modules, while at the same time facilitating access to individual modules for cartridge replacement. Each module includes an elongated cylindrical reaction chamber with end caps, with the end caps being designed to sealingly engage and retain individual cartridges for use within the module, while at the same time providing for accommodating a wide range of tolerance for variations in cartridge length.

1 Claim, 2 Drawing Sheets

MODULAR ASSEMBLY FOR HOLLOW MEMBRANE FIBER CARTRIDGES

CROSS-REFERENCE TO RELATED APPLICATION

The present invention is a utility patent application disclosed in Provisional Application Ser. No. 60/207,600, filed May 26, 2000 of Thomas J. McEvoy, entitled "MODULAR ASSEMBLY FOR HOLLOW MEMBRANE FIBER CARTRIDGES".

BACKGROUND OF THE INVENTION

The present invention relates generally to improvements in hollow membrane or hollow fiber cartridge assemblies, and more particularly to a modular assembly for releasably retaining such cartridges in an operative configuration within a reaction chamber. Hollow membrane fibers have particular utility in filtration, including ultra-filtration as well as in reverse osmosis applications. The modular assembly of the present invention includes an assembly with a reaction chamber particularly adapted for use in connection with fluid (gas or liquid) separation cartridges, with particular application to fluid separation cartridges within a vacuum chamber and with selective permeability to selected fluids. Specifically, the modular assembly of the present invention permits simultaneous utilization of any desired number of cartridges operating in parallel, each containing hollow membrane or hollow fibers, preferably porous, thereby providing for a plurality of such cartridges arranged and configured in modular form within a single reaction chamber which is held at a desired absolute pressure, and wherein each of the cartridges are individually and readily accessible. In this modular arrangement and assembly, individual cartridges may be installed, replaced, exchanged, as required for the given application.

As indicated above, hollow fibers and membranes have been employed for a variety of applications, with examples of such fibers and applications being shown in U.S. Pat. Nos. 4,806,246 and 5,824,444, as well as in application Ser. No. 08/824,302, filed Mar. 26, 1997, entitled "GAS SEPARATION USING HOLLOW FIBER CONTAINED LIQUID MEMBRANE", Sirkar et al., all of which are assigned to the assignee of the present invention, and with the subject matter of each being incorporated by reference herein. Such hollow fibers typically have a continuous lumen disposed along the axis of the fiber, with the walls being porous, and with the outer wall having a coating thereon as defined in U.S. Pat. Nos. 4,806,246 and 4,824,444, and application Ser. No. 08/824,302 hereinabove.

SUMMARY OF THE INVENTION

For these applications, hollow fibers are typically arranged or configured within bundles, and such bundles are then operatively arranged in a cylindrical shell with appropriate access or ports being provided for the operative ends of the individual cartridges (see U.S. Pat. No. 4,824,444). In this connection, access to the lumens within the individual fibers is obtained through inlet and outlet manifolds disposed within the caps forming cartridge end chambers.

In a typical operative embodiment, feed fluids are delivered to the inlet manifold of the chamber, and thereafter passed through fiber lumens. The walls of the cartridges or sleeves in which the individual fibers are retained are typically perforated in a reticulated pattern to expose the feed fluid to the sweep fluid present within the reactivity zone of the chamber. In certain instances, a selected liquid or gas is passed through the reactivity chamber or zone, or alternatively, the zone may be maintained at a reduced pressure or to a vacuum state.

In connection with the operations typically utilizing the modular assembly of the present invention, a fluid is treated under pressure (feed pressure) at least sufficient to transport the fluid through the fiber lumens where components of the fluid, either liquid or gaseous, are separated through a membrane permeable to the component being separated. The feed pressure is appropriate for the properties of the fluids being handled, as well as being selected to be within the operating parameters of the individual fibers and membrane.

An assembly or system fabricated in accordance with the present invention is useful for a wide variety of applications, the following being typical of such applications:

1. Pervaporation, particularly with lumen feed;
2. Supported liquid membranes:
   (a) liquid/liquid extraction metals or valuable chemicals;
   (b) gas separations or waste water treatment (feed and sweep or feed and vacuum);
   (c) facilitated transport;
3. VOC/gas separations, particularly with lumen feed;
4. hollow fiber contained liquid membranes;
5. supported liquid membrane pervaporation; and
6. membrane distillation or osmotic membrane distillation.

During typical operational applications, failure of one or more fibers within a bundle may require prompt replacement. The system of the present invention permits the replacement of the cartridge containing the damaged fiber without disturbing and/or replacing the remaining cartridges. Such module replacement may be undertaken on an expedited basis, thereby requiring removal of only one modular vessel from an operative system.

In any typical operative embodiment, individual cartridges require replacement from time to time. Replacement is indicated when individual fibers become exhausted, ruptured or damaged for one reason or another. For example, the expected lifetime of the fibers may expire, thereby requiring general replacement of all cartridges. The modular assembly of the present invention provides an expedient for exchanging individual cartridges whenever individual replacement is indicated. In this connection, the individual cartridges have end caps which are in the shape of truncated cones, with matching or mating truncated conical openings being formed in the end caps or end plates of the chamber assembly. Additionally, the truncated ports formed in the end plates have an inwardly extending flange or lip to function as a stop and hold the cartridges securely in place sealed within the conical openings, thereby facilitating ease of removal and/or installation. Additionally, O-rings may be utilized, with the O-rings being retained or held in annular grooves formed in the end caps along with the inwardly extending annular lip. In any event, given the tolerances in manufacture, and given that the length of the assembly will be indexed off of that certain cartridge having the greatest axial length, the mating truncated cone arrangement provides for reliable sealing of all cartridges in the overall arrangement. The O-ring arrangement likewise provides for reliable seals.

The features of the present invention provide for ease of system design as contrasted with conventional usage of either a jungle maze of connections tied to individual small diameter modules or, large diameter bundles, with concommitant risks of system failure due to partial membrane bundle leakage and the like, and also limited flexibility to mix fiber types, fluid types or pressures in one module assembly. The features of the present invention facilitate and expedite the steps involved in system design. By way of example, systems may be designed to utilize columns of various diameters so as to provide for and facilitate the utilization of multiple numbers of cartridges including, for example, four, eight, twelve, and/or eighteen, and the like. The modules in which these cartridges are retained are preferably arranged in parallel configuration for proceeding with their processing applications. Larger numbers of cartridges may be utilized as well.

Therefore, it is a primary object of the present invention to provide an improved modular assembly for cartridges with groups or bundles of hollow fibers, and wherein the modular assembly provides means for operatively retaining a plurality of such cartridges in place within the confines of a reaction or reactivity zone.

It is a further object of the present invention to provide an improved modular assembly for mounting a plurality of hollow fiber cartridges, with the interior of the modular assembly defining a reactivity zone or chamber which accommodates the flow of a sweep gas or liquid, vacuum, reactive fluid, or the like.

Other and further objects of the present invention will become apparent to those skilled in the art upon a study of the following specification and accompanying drawings.

IN THE DRAWINGS

DESCRIPTION OF THE PREFERRED EMBODIMENT

Figure 1:
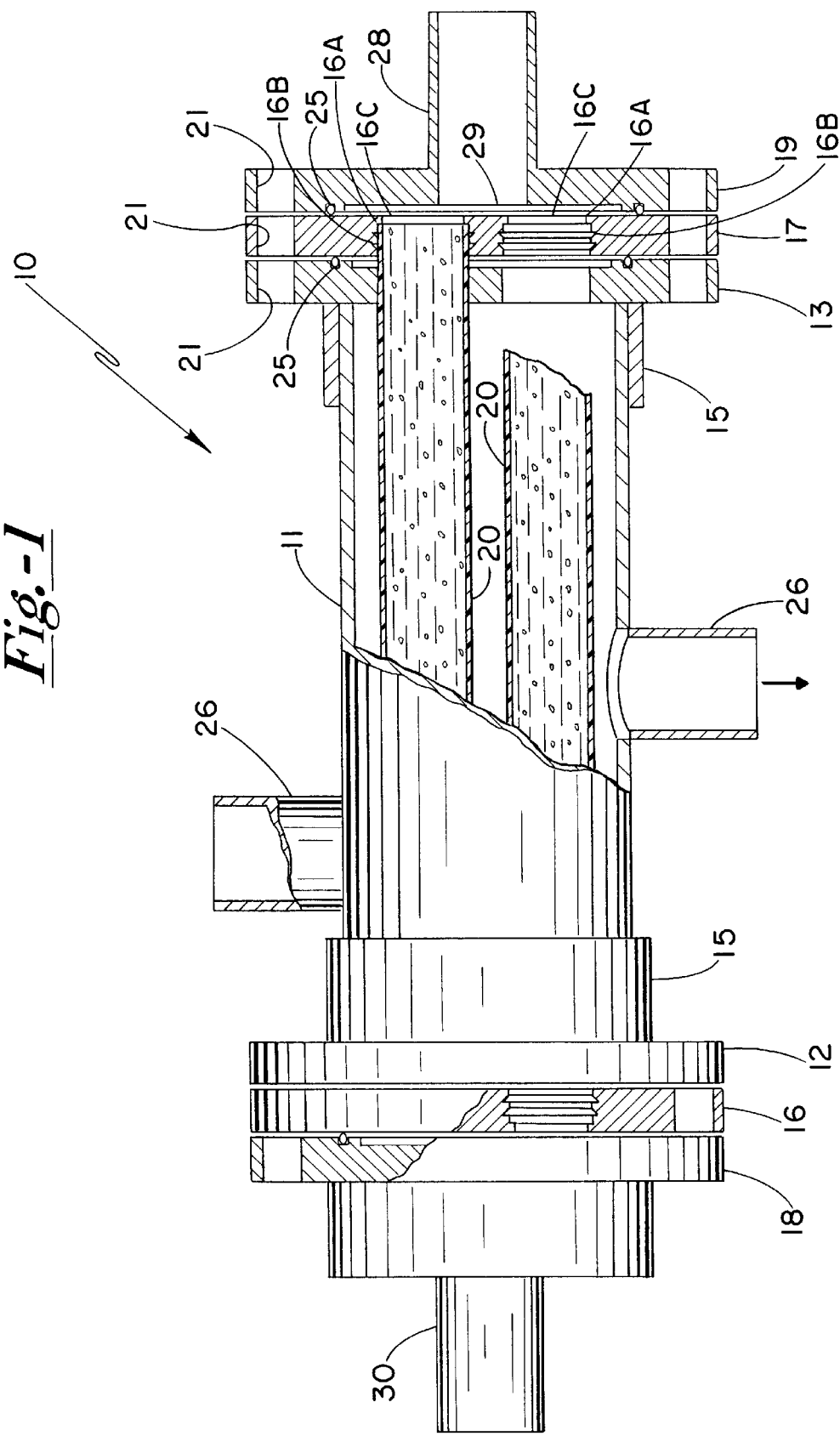
FIG. 1 is a side elevational view of a typical modular chamber for receiving a plurality of hollow fibers in operative disposition therewithin, with FIG. 1 being partially broken away to show two of the individual fiber containing cartridges disposed therewithin.
Figure 2:
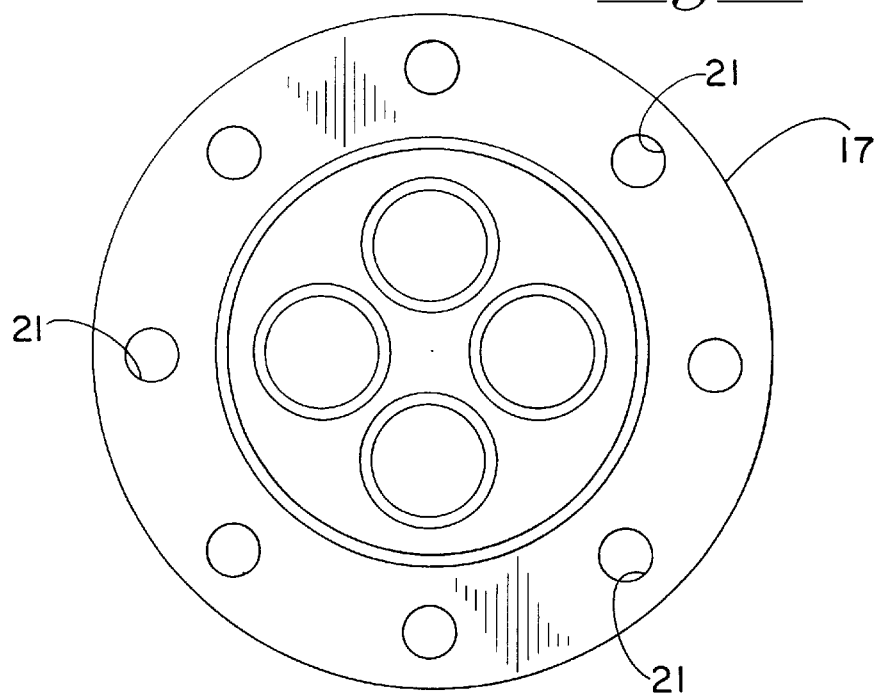
FIG. 2 is a plan view of the inner surface of a module end plate with four cartridge receiving bores formed therewithin.
Figure 3:
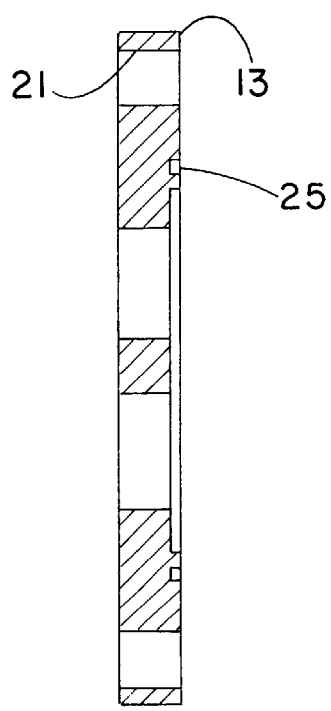
FIG. 3 is a sectional view taken along the line and in the direction of the arrows 3—3 of FIG. 2.
Figure 4:
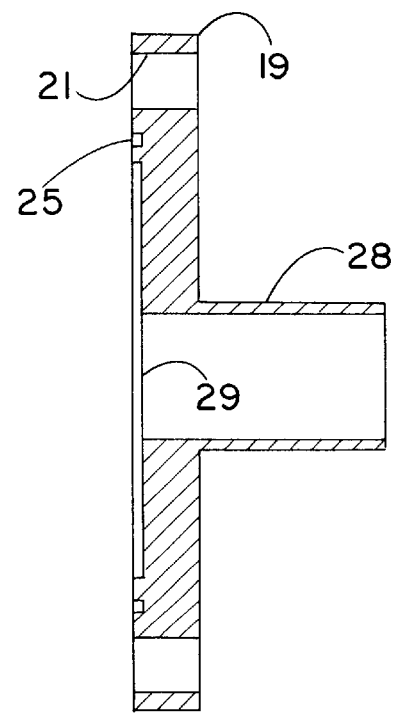
FIG. 4 is a plan view of the inner face of the inlet and outlet end plates and illustrating the plenum chamber formed therewithin.

In accordance with the preferred embodiment of the present invention, the modular chamber assembly generally designated 10 includes a hollow vessel in the form of an elongated cylindrical vessel forming a chamber 11 having a module inlet and outlet plates 12 and 13 mounted and/or secured to opposed ends thereof. Sleeve retainers 15—15 may be utilized to surround and support the end portions of vessel 11. Adjacent plates 12 and 13 are inlet and outlet module plates 16 and 17 respectively, with plates 16 and 17 being adapted to sealingly receive and retain the operative ends of hollow fiber cartridges retained therewithin. In addition, end flange plates 18 and 19 are provided, thereby forming the flanged ends of the overall assembly. For closure, the individual flanged elements are provided with a series of arcuately spaced radially outwardly positioned bores 21—21 to receive a clamping bolt and nut therewithin. In order to appropriately seal the system, particularly in the feed side, O-ring retaining annular grooves such as is shown at 25—25 may be employed on each plate 18 and 19. These grooves and seals serve to isolate the interior of the system during operation.

Module plates 16 and 17 are provided with bores as at 16A—16A (FIG. 1), with these bores having a truncated conical configuration which is complimentary to truncated cones forming the ends of the hollow fiber cartridge end caps. As such, the cartridge end caps will seat within the confines of bores 16A and form an appropriate seal. Additionally, internally extending lips 16B—16B are provided for the end of the cartridge end cap to index and receive an O-ring and to seal accordingly, with lip flange 16C also serving as an annular stop element for the cartridge ends. Stepped conical configurations are acceptable for the interior profile of the bores 16A—16A.

Chamber ports 26—26 (FIG. 1) are utilized to pass a sweep fluid through the system. For example, port 26 may be utilized to evacuate the chamber so as to create a desired vacuum when appropriate for the operation.

In an actual operation, hollow fiber cartridges such as illustrated at 20—20 are secured within the confines of reaction chamber 11 by means of sealing engagement with truncated conical bores 16A—16A. Ports 26—26 are employed to control the environment within the reaction chamber such as through evacuation or alternatively introduction and passage of a sweep gas therethrough.

For transmission of the fluid through the hollow fibers contained within the cartridges, fluid is introduced through inlet port 28 and into plenum area or zone 29 formed as a recess within plate 19. Flow then continues through individual cartridges 20—20, and passes outwardly through outlet port 30. A plenum similar to that of plenum 29 is formed in plate 18, where indicated.

The structure of the present device is such that hollow fiber cartridges can be introduced into the system interchangeably, as required. Also, the arrangement is such that one of the individual modules such as module 10 may be removed from a parallel flow arrangement to permit replacement and/or replenishing of the cartridges, while the remaining portions of the overall system remain in operation.

With respect to port design and location, the addition of properly positioned and configured fluid connected ports permits one to flexibly adapt the assembly to a myriad of membrane separation applications.

1. Double opposed radially extending ports and/or axially spaced ports on the column for sweep fluid (gas or liquid);

2. Multi-port ends for dual flow systems such as HFCLM. The fluid surrounding the fibers may be stirred, recycled, and/or swept into vortex shedding patterns to enhance mixing and removal efficiency;

3. Provision may be made via appropriate port/ distribution means to provide different pressures to different bundle sets for HFCLM and similar applications;

4. Mixtures of bundle plus (hydrophilic coated fibers and hydrophobic) may be inserted and usefully put to advantage for multi-extraction applications by proper port and fluid connections in which A and B are separated from C;

5. Header design may be undertaken to adapt a system for multiple inputs and outputs, including, for example, flow splitting through use of modified headers.

By way of materials of construction, the selected material is one exhibiting the greatest tolerance for solvents which are likely to be encountered during the normal operations of the system. For most applications, however, it has been found that polypropylene is an appropriate choice, with this material having good flexural strength and usable up to temperatures of about 120° C. Polypropylene is insoluble in most organic solvents when cold, with the material being known to have low water absorption and moisture permeability. A further feature is that it is normally not attacked by fungi or bacteria, and withstands exposure to strong acids and alkalis of up to about 60° C.

It will be appreciated that the examples provided herein are for purposes of illustration only and are not to be construed as a limitation upon the scope to which this invention is otherwise entitled.

What is claimed is:

1. A modular fluid treatment system in combination with a plurality of fluid transmitting hollow fiber cartridges, each containing a bundle of hollow fibers, and being maintained within the controlled environment of a reaction chamber wherein the system comprises:

(a) chamber means comprising an elongated cylindrical vessel with opposed ends, and with chamber inlet and outlets formed through the walls of said vessel for maintaining the controlled environment within said chamber;

(b) a plurality of flanged end plates sealingly coupled to said opposed end walls and including:

(1) an inlet plate at one end and an outlet plate at the opposed end of said vessel, each being sealingly coupled to said ends and with each of said inlet and outlet plates having a plurality of hollow fiber cartridge guide bores formed therethrough;

(2) an inlet module plate at one end and an outlet module plate at the opposed end, and each being superimposed in sealed stacked relationship to said inlet and outlet plates respectively and with each of said module plates having a plurality of radially disposed arcuately spaced truncated conical hollow fiber cartridge receiving bores formed therein to sealingly receive and sealably retain the mating truncated conical end of a hollow fiber cartridge therewithin, each bore having an inwardly extending annular flange stop seat formed at the converging tapered distal base thereof;

(3) inlet and outlet end flange plates, one disposed at each of said opposed ends and each being superimposed in sealed stacked relationship to respective said module plates with said inlet flange plate having an inlet port extending therethrough and with said outlet flange plate having an outlet port extending therethrough, each of said ports being coaxial with said inlet flange plate;

(4) a recessed zone formed along an inner surface of each of said end flange plates forming inlet and outlet plenums respectively, said recess zones being arranged coaxially with each of said end flange plates and in opposed relation to said hollow fiber cartridge receiving bores, the arrangement being such that communication is established between said inlet and outlet ports and the respective ends of said hollow fiber cartridges; and (c) said hollow fiber cartridge bores having a truncated conical configuration tapering outwardly of said cylindrical vessel, with annular ring seals being disposed at axially spaced dispositions therealong so as to removably and sealingly engage the correspondingly shaped and mating outer tapered configuration of the end portions of each of said hollow fiber cartridges.

* * * * *